US009968002B2

United States Patent
Wang et al.

(10) Patent No.: US 9,968,002 B2
(45) Date of Patent: May 8, 2018

(54) HEAT-TRANSFER MECHANISM OF MOTOR PRIMARY

(71) Applicant: HIWIN MIKROSYSTEM CORP., Taichung (TW)

(72) Inventors: Hsiang-Ju Wang, Taichung (TW); Chien-Chih Lin, Taichung (TW); Chao-Chin Teng, Taichung (TW); Cheng-Te Chi, Taichung (TW)

(73) Assignee: HIWIN MIKROSYSTEMS CORP., Taichung (TW)

( * ) Notice: Subject to any disclaimer, the term of this patent is extended or adjusted under 35 U.S.C. 154(b) by 82 days.

(21) Appl. No.: 15/274,683

(22) Filed: Sep. 23, 2016

(65) Prior Publication Data

US 2018/0092250 A1    Mar. 29, 2018

(51) Int. Cl.
*F24D 3/16*    (2006.01)
*H05K 7/20*    (2006.01)

(52) U.S. Cl.
CPC ..... *H05K 7/20281* (2013.01); *H05K 7/20254* (2013.01)

(58) Field of Classification Search
CPC ............ H05K 7/20281; H05K 7/20254; F24F 12/001; F24F 12/006; H02K 9/22; H02K 1/20; H02K 1/32; H02K 3/24; H02K 9/24
USPC ................ 165/56; 310/12.29, 52, 53, 64, 65
See application file for complete search history.

(56) References Cited

U.S. PATENT DOCUMENTS

| 4,916,340 | A  | * | 4/1990  | Negishi ................ | B23Q 1/621 310/12.05 |
| 2002/0113498 | A1 | * | 8/2002  | Emoto ................... | H02K 9/22 310/12.25 |
| 2003/0141769 | A1 | * | 7/2003  | Kubo .................. | G03F 7/70758 310/12.06 |
| 2004/0070938 | A1 | * | 4/2004  | Hazelton ............ | H05K 7/20254 361/688 |
| 2005/0012403 | A1 | * | 1/2005  | Binnard ................ | H02K 41/03 310/12.06 |
| 2007/0252444 | A1 | * | 11/2007 | Sadakane ............. | H02K 41/031 310/12.21 |
| 2012/0062866 | A1 | * | 3/2012  | Binnard .................. | H02K 9/22 355/72 |
| 2013/0069449 | A1 | * | 3/2013  | Pharand .............. | H02K 41/031 310/12.02 |
| 2013/0164687 | A1 | * | 6/2013  | Binnard ............... | H02K 41/031 430/322 |

* cited by examiner

*Primary Examiner* — Justin Jonaitis
(74) *Attorney, Agent, or Firm* — Guice Patents PLLC

(57) ABSTRACT

The present invention provides a heat-transfer mechanism of a motor primary, wherein a heat-transfer member having a metallic body is sandwiched between a motor moving member and a bearing member, such that the heat-transfer member separates the bearing member from the motor moving member to prevent direct contact there-between while the heat-transfer member is used as a heat-conducting medium, and therefore, heat energy on the bearing member and the motor moving member can be gathered in the heat-transfer member, and the effect of effectively dissipating, by means of conduction, the heat energy from the motor moving member and from the bearing member driven by the motor can be achieved.

10 Claims, 5 Drawing Sheets

HEAT-TRANSFER MECHANISM OF MOTOR PRIMARY

FIELD OF THE INVENTION

The present invention relates to a motor, and more particularly to a heat-transfer mechanism of a motor primary.

DESCRIPTION OF THE RELATED ART

A driving motor of a precision processing machine requiring high thrust such as a machine tool or a PCB drilling machine produces a large amount of heat energy while providing the high thrust. If the heat energy is not timely blocked from being conducted to an adjacent precision processing mechanical part such as a base or motion platform, the base or platform will be deformed under the effect of heat energy, which directly affects the precision processing level that can be achieved.

To prevent deformation of a processing machine under the effect of heat energy, in the prior art shown in FIG. 1 and FIG. 2, a thermal insulation plate 1 is suspended over an end surface on one side of a motor 3 by means of a plurality of spacers 2, to avoid direct contact between the thermal insulation plate 1 and the motor 3, thereby reducing transfer of heat energy from the motor. Meanwhile, a copper coil pipe 4 penetrates through the spacers 2, with one side of the pipe being attached to the thermal insulation plate 1, and a fluid continuously flows in the coil pipe 4, such that through direct contact between the pipe and the thermal insulation plate, the heat energy on the thermal insulation plate 1 is conducted to the flowing fluid and is then dissipated, thereby preventing outward transfer of the heat energy from the thermal insulation plate.

In the prior art, the heat energy from the motor is blocked from being transferred outward by reducing the temperature rise degree of the thermal insulation plate. Although this provides some effect, because the spacers 2 are provided to prevent the heat energy from being conducted from the motor 3 to the thermal insulation plate 1, the material of the spacers 2 is required to have low thermal conductivity for the purpose of thermal insulation. As a result, the heat energy produced by the motor 3 in operation is difficult to be dissipated and thus the operating efficiency of the motor is affected. Also, the assembly and processing of the plurality of spacers 2 are excessively complex, thereby adversely affecting the maintenance of manufacturing efficiency and quality.

SUMMARY OF THE INVENTION

In view of the above, the main objective of the present invention is to provide a heat-transfer mechanism of a motor primary, which has the effect of easy assembly, and can effectively dissipate, by means of conduction, the heat energy from a motor moving member and from a bearing member driven by the motor.

Therefore, to achieve the above objective, the heat-transfer mechanism of the motor primary provided by the present invention has the main technical feature that, a heat-transfer member having a metallic body is sandwiched between a motor moving member and a bearing member, such that the heat-transfer member separates the bearing member from the motor moving member to prevent direct contact therebetween while the heat-transfer member is used as a heat-conducting medium, and therefore, the heat energy on the bearing member and the motor moving member can be gathered in the heat-transfer member and then dissipated by the heat-transfer member, thereby avoiding deformation caused by the heat energy. Compared with the prior art that focuses on heat transfer at a single side, the heat-transfer range of the present invention is larger and deformation can be better avoided.

In the specific technical content, the heat-transfer mechanism of the motor primary provided by the present invention includes a bearing member, at least one heat-transfer member and a moving member. The bearing member is an element that is displaced with the motion of the moving member, does not belong to the motor, and has a first end surface. The heat-transfer member has a metallic body; a second end surface, located on one side of the metallic body, and oppositely attached to the first end surface; a third end surface, located on the other side of the metallic body opposite to the second end surface; and a flow channel, located in the metallic body and between the second end surface and the third end surface, openings for external connection being formed at two ends of the metallic body respectively. The moving member is attached to the third end surface.

To further simplify the assembly and processing procedure, pre-assembly is performed by using a base member. The base member is sandwiched between the first end surface and the second end surface, such that the first end surface and the second end surface are indirectly attached to each other by means of the base member.

In the pre-assembly, the heat-transfer member may be bonded to the base member through soldering, screwing or other fastening means. Structures of holes that coaxially correspond to each other are provided on the heat-transfer member and the base member respectively for penetration of connecting elements such as bolts, which facilitates bonding of the moving member and the bearing member.

In addition, to expand the heat-transfer range, the number of the heat-transfer member may be two, and the flow channels of the heat-transfer members are connected by using a hollow extension member, thereby forming a loop in which an external fluid can flow.

DETAILED DESCRIPTION OF THE PREFERRED EMBODIMENTS

Figure 1:
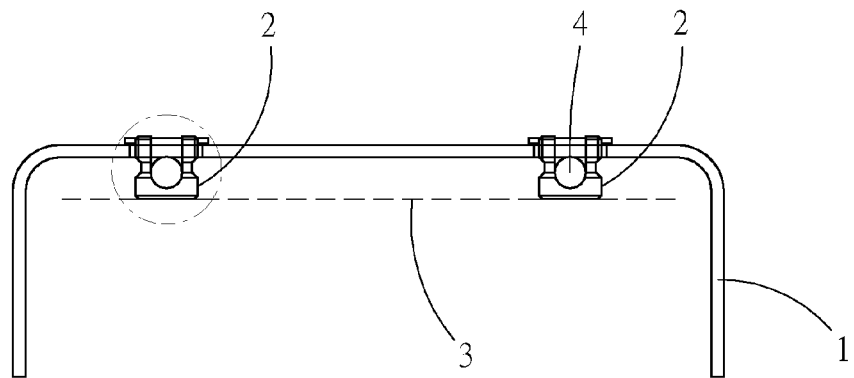
FIG. 1 is a schematic cross-sectional view of the prior art.
Figure 2:
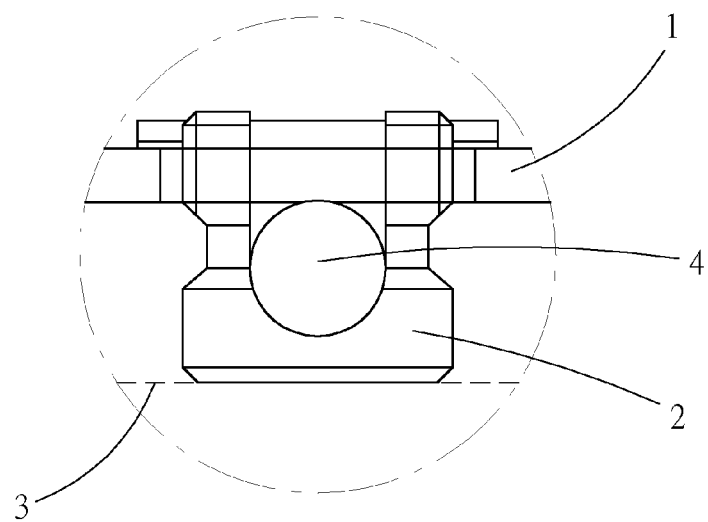
FIG. 2 is a schematic partial cross-sectional view of the prior art.
Figure 3:
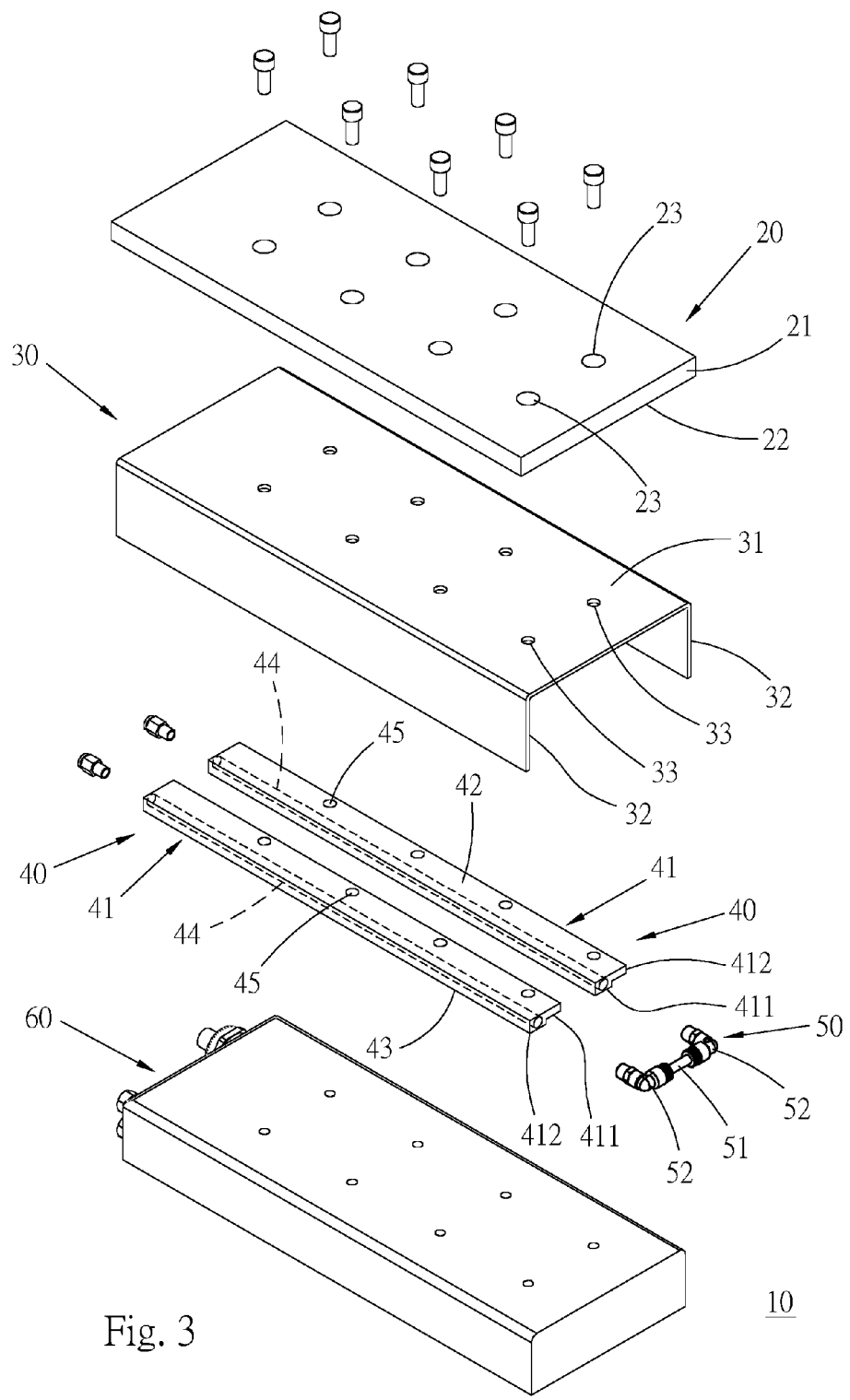
FIG. 3 is an exploded view of an embodiment of the present invention.
Figure 4:
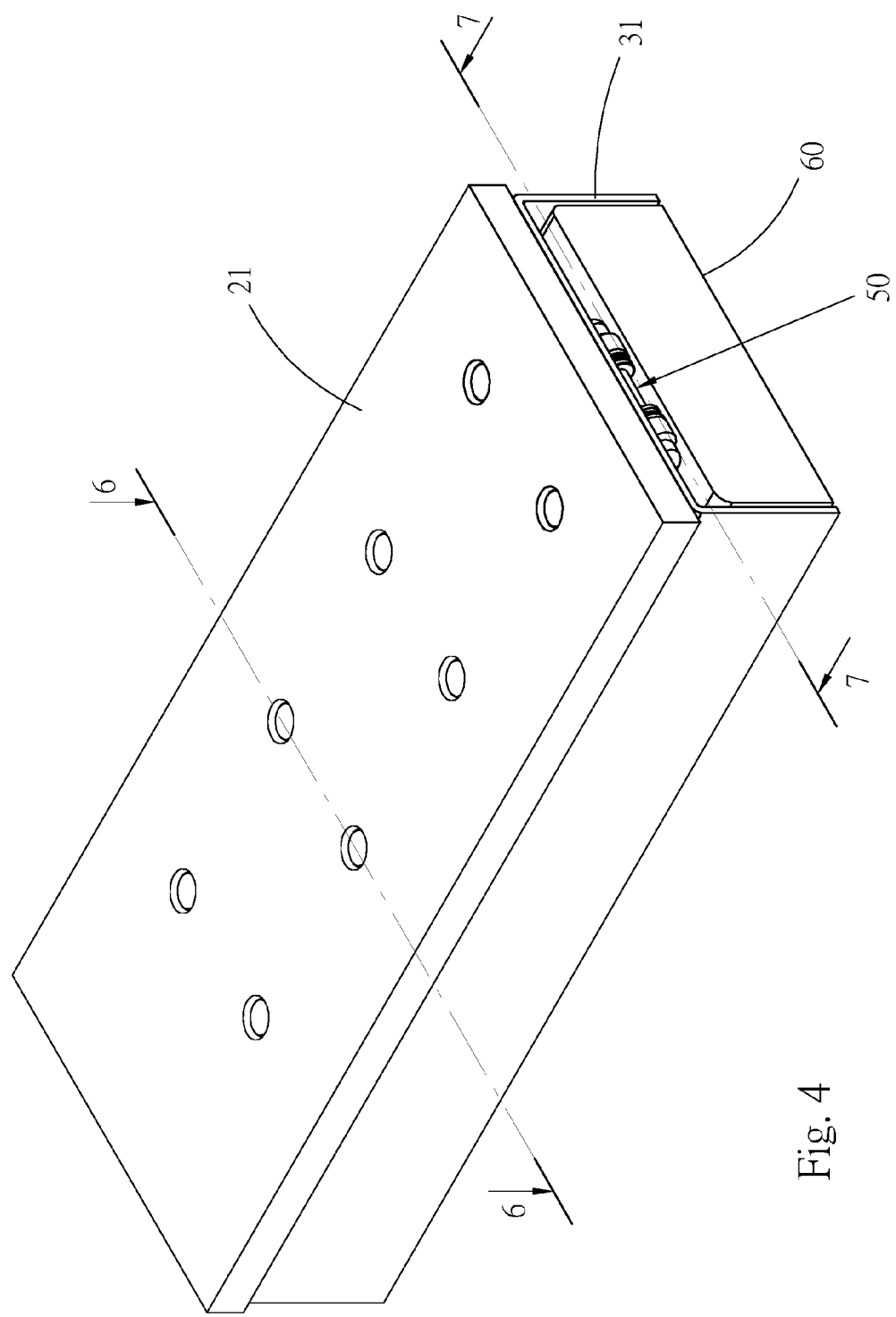
FIG. 4 is an assembly view of an embodiment of the present invention.
Figure 5:
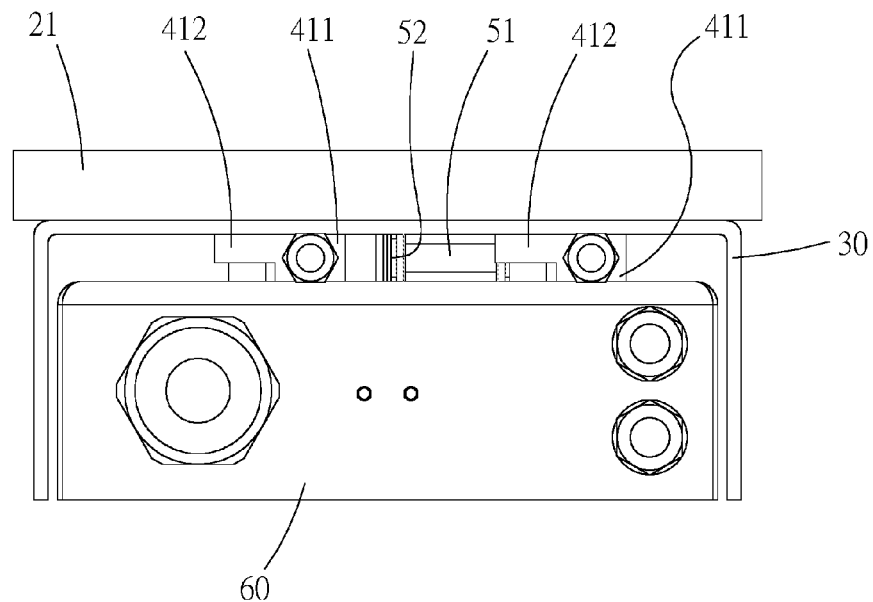
FIG. 5 is an end view of an embodiment of the present invention.
Figure 6:
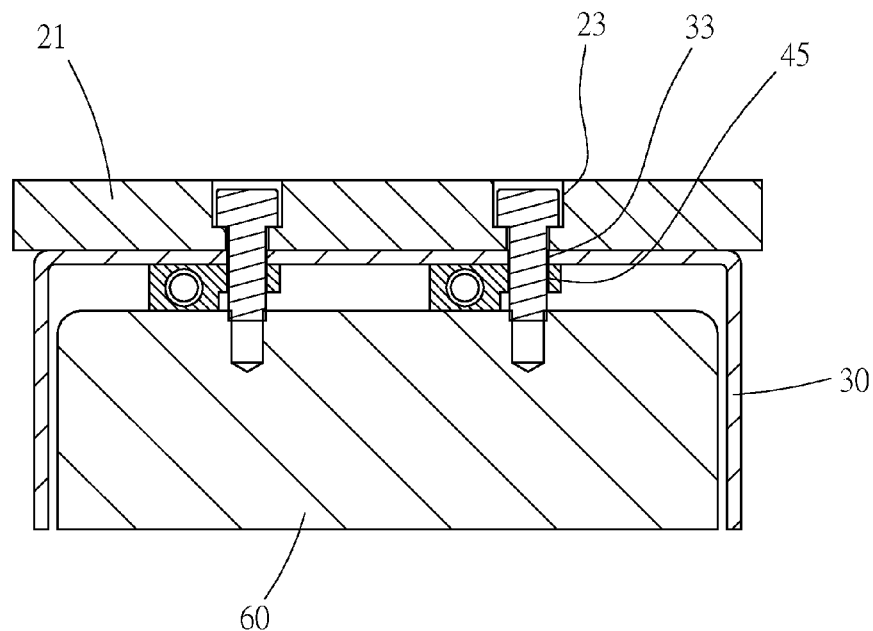
FIG. 6 is a cross-sectional view of an embodiment of the present invention along the section line 6-6 in FIG. 4.
Figure 7:
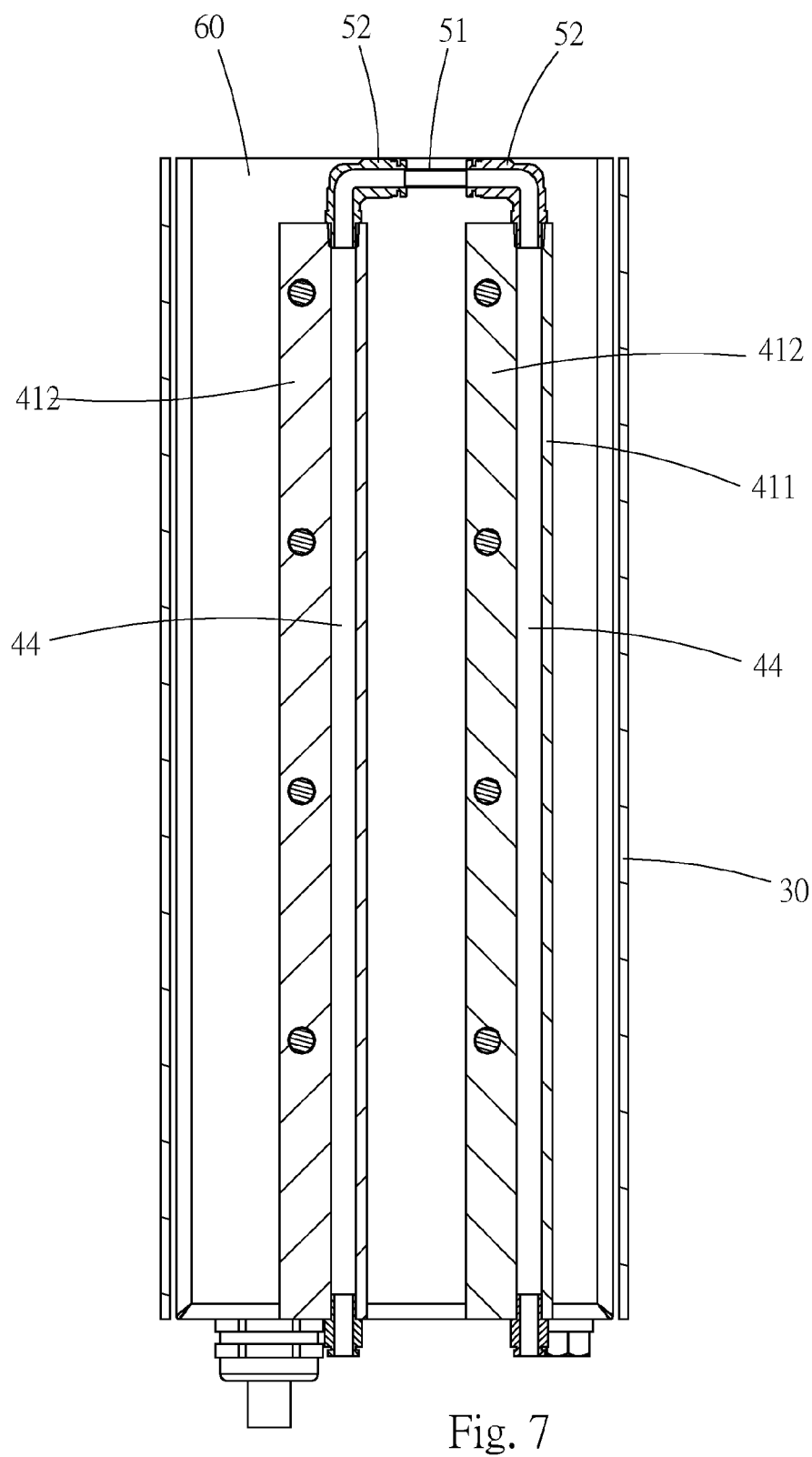
FIG. 7 is a cross-sectional view of an embodiment of the present invention along the section line 7-7 in FIG. 4.

Firstly, referring to FIG. 3, a heat-transfer mechanism of a motor primary 10 provided in an embodiment of the present invention mainly includes a bearing member 20, a base member 30, two heat-transfer members 40, an extension member 50, and a moving member 60.

The bearing member 20 is displaced with the motion of the moving member 60; may serve as a motion platform of a processing machine or a connecting element for connecting a motion platform and the moving member, and may also serve as any other element driven by the moving member; and has a platform 21, a first end surface 22 located on one side of the platform 21, and a plurality of stepped holes 23 penetrating through the platform 21.

The base member 30 has a plate-shaped base body 31, two parallel side plates 32 integrally formed at two sides of the base body 31, and a plurality of perforations 33 penetrating through the base body 31.

Each of the heat-transfer members 40 has a metallic body 41 which is a bar-shaped body made of aluminum or an aluminum alloy through extrusion; a second end surface 42 and a third end surface 43 opposite to and parallel to each other, located on opposite sides of the metallic body 41 respectively; a flow channel 44, located in the metallic body 41, openings being respectively formed at two ends of the long axis of the metallic body 41 such that the flow channel 44 can be communicated with the outside; and a plurality of through-holes 45 penetrate through the metallic body 41 between the second end surface 42 and the third end surface 43, and are not communicated with the flow channel 44.

Further, each metallic body 41 has a body portion 411 and a wing portion 412 connected in parallel. The flow channel 44 is a tubular space provided in the body portion 411, orifices are formed at two ends of the body portion 411, and each through-hole 45 penetrates through the wing portion 412. In addition, the second end surface 42 is located on one side of the body portion 411 and extends to one side of the wing portion 412 that is connected in parallel with the body portion 411, and the third end surface 43 is merely provided on the other side of the body portion 411.

The extension member 50 has a pipe 51 and two connectors 52. The connectors 52 are hollow and are respectively provided at two ends of the pipe 51.

The moving member 60 is, for example, a linear motor mover that is known in the prior art, and is capable of producing a linear reciprocating displacement under the effect of a magnetic field.

Further, referring to FIG. 4 to FIG. 7, with the above members, in the assembly of the heat-transfer mechanism of the motor primary 10, the heat-transfer members 40 may be bonded to the base member 30 through soldering, screwing or other fastening means in advance, such that the through-holes 45 and the perforations 33 respectively coaxially correspond to each other, and the flow channels 44 are communicated with each other with the extension member 50, whereby the flow channels 44 of the heat-transfer members 40 form a loop in which an external fluid can continuously flow.

Next, the base member 30 after pre-assembly is disposed between the moving member 60 and the bearing member 20, such that each third end surface 43 is attached to the moving member 60, each second end surface 42 is indirectly connected to the first end surface 22 through the base member 30, and a plurality of bolts respectively penetrate through the holes 23, the perforations 33 and the through-holes 45 and are screwed to the moving member 60. Therefore, the operating process of assembly is rapidly completed, and the assembly and processing procedure is significantly simplified and the efficiency is improved as compared with the prior art.

Moreover, even if the pre-assembly process is not performed or the base member is not provided, and the heat-transfer members are sandwiched between the bearing member and the moving member and are assembled directly by bolts, the present invention is more convenient than the prior art in assembly.

In addition to the effect of easy assembly, the construction of attaching each third end surface 43 to the moving member 60 enables heat energy to be conducted between the moving member 60 and each metallic body 41, and the construction of indirectly connecting each second end surface 42 and the first end surface 22 enables heat energy to be conducted between the bearing member 20 and each metallic body 41. Therefore, when an external low-temperature fluid is continuously filled in the flow channels 44 that form a loop and flows therein, the temperature of each metallic body 41 is reduced, and the heat energy is conducted toward the metallic body 41, thereby achieving the effect of reducing the temperature of the moving member 60 and the bearing member 20.

What is claimed is:

1. A heat-transfer mechanism of a motor primary, comprising:
   a bearing member, having a first end surface;
   at least one heat-transfer member, having a metallic body; a second end surface, located on one side of the metallic body, and oppositely attached to the first end surface of the bearing member; a third end surface, located on the other side of the metallic body opposite to the second end surface; and a flow channel, located in the metallic body and between the second end surface and the third end surface, openings for external connection being formed at two ends of the metallic body respectively; and
   a moving member, attached to the third end surface of the heat-transfer member.

2. The heat-transfer mechanism of the motor primary according to claim 1, wherein the heat-transfer member further comprises a plurality of through-holes that penetrate through the metallic body between the second end surface and the third end surface, and are not communicated with the flow channel.

3. The heat-transfer mechanism of the motor primary according to claim 2, wherein the metallic body has a body portion and a wing portion, the flow channel being located in the body portion, and the through-holes penetrating through the wing portion.

4. The heat-transfer mechanism of the motor primary according to claim 3, wherein the second end surface and the third end surface are located on two sides of the body portion respectively.

5. The heat-transfer mechanism of the motor primary according to claim 4, wherein the second end surface extends to one side of the wing portion.

6. The heat-transfer mechanism of the motor primary according to claim 1, further comprising a base member sandwiched between the first end surface and the second end surface such that the first end surface and the second end surface are indirectly attached to each other by means of the base member.

7. The heat-transfer mechanism of the motor primary according to claim 6, wherein the heat-transfer member has a plurality of through-holes penetrating through the metallic body; and the base member has a plurality of perforations coaxially corresponding to the through-holes respectively.

8. The heat-transfer mechanism of the motor primary according to claim 1, wherein the number of the comprised heat-transfer member is two, and the two heat-transfer members are spaced from each other.

9. The heat-transfer mechanism of the motor primary according to claim 8, further comprising a hollow extension member, wherein the extension member is located between the heat-transfer members, and the flow channels of the heat-transfer members are communicated with each other with the hollow interior of the extension member.

10. The heat-transfer mechanism of the motor primary according to claim 9, wherein the extension member is tubular.

* * * * *